(12) United States Patent  
Niehaus et al.

(10) Patent No.: US 11,788,273 B2  
(45) Date of Patent: Oct. 17, 2023

(54) DEVICE AND METHOD FOR ANCHORING AN EQUIPMENT TO A CIVIL ENGINEERING STRUCTURE

(71) Applicant: FRAMATOME, Courbevoie (FR)

(72) Inventors: Gaëtan Niehaus, Villeurbanne (FR); Pascal Morlot, Marcy l'Etoile (FR); Jean-Charles Hurel, Saint Maurice de Gourdans (FR)

(73) Assignee: FRAMATOME, Courbevoie (FR)

( * ) Notice: Subject to any disclaimer, the term of this patent is extended or adjusted under 35 U.S.C. 154(b) by 255 days.

(21) Appl. No.: 16/772,144

(22) PCT Filed: Dec. 14, 2018

(86) PCT No.: PCT/EP2018/084882  
§ 371 (c)(1),  
(2) Date: Jun. 11, 2020

(87) PCT Pub. No.: WO2019/115742  
PCT Pub. Date: Jun. 20, 2019

(65) Prior Publication Data  
US 2021/0071411 A1 Mar. 11, 2021

(30) Foreign Application Priority Data  
Dec. 15, 2017 (FR) ..................... 17 62280

(51) Int. Cl.  
*E04B 1/41* (2006.01)  
*F16B 5/02* (2006.01)  
*E04B 1/38* (2006.01)

(52) U.S. Cl.  
CPC .............. *E04B 1/41* (2013.01); *F16B 5/0225* (2013.01); *E04B 2001/405* (2013.01); *E04B 2103/06* (2013.01)

(58) Field of Classification Search  
CPC ........ E04B 1/40; E04B 1/41; E04B 2001/405; E04B 2103/06; F16B 5/0225  
(Continued)

(56) References Cited

U.S. PATENT DOCUMENTS 3,628,299 A * 12/1971 Nakazawa ............ E04B 1/4107  
                                            52/506.06  
3,695,139 A * 10/1972 Howe ...................... F16B 5/025  
                                            411/432

(Continued)

FOREIGN PATENT DOCUMENTS

AT         513575 A1 * 5/2014 ............... E04B 1/41  
DE         2449897 A1 * 4/1975 ............... F16B 43/00

(Continued)

OTHER PUBLICATIONS

Corresponding Search Report PCT/EP2018/084882.

*Primary Examiner* — Brian D Mattei  
*Assistant Examiner* — Joseph J. Sadlon  
(74) *Attorney, Agent, or Firm* — Davidson, Davidson & Kappel, LLC

(57) ABSTRACT

An anchoring device (1) for anchoring an equipment to a civil engineering structure includes a support plate (5) for the equipment, with at least two orifices (7); for each orifice (7), a longitudinal dowel (13) intended to be rigidly fastened in the civil engineering structure (3); for each orifice (7), a fastening member (25) mounted around the dowel (13); for each orifice (7), a connection (27) of the fastening member (25) to the plate (5), allowing the fastening member (25) to be placed at any given position in a defined region of the orifice (7) in a plane parallel to the plate (5); and for each orifice (7), a reversible lock (55) for blocking the fastening (Continued)

member (25) with respect to the plate in the given position and for blocking the fastening member in position along the dowel (13).

20 Claims, 3 Drawing Sheets

(58) Field of Classification Search
 USPC .......................................................... 411/353
 See application file for complete search history.

(56) References Cited

U.S. PATENT DOCUMENTS

| | | | | |
|---|---|---|---|---|
| 3,714,859 | A * | 2/1973 | Tupper | F16B 31/02 188/374 |
| 4,040,228 | A * | 8/1977 | Skubic | E04B 1/4107 411/302 |
| 4,114,329 | A * | 9/1978 | Fischer | B23B 51/0027 206/338 |
| 4,289,415 | A * | 9/1981 | Fishinger | F16B 5/0233 403/104 |
| 4,569,167 | A * | 2/1986 | Staples | E04B 1/04 52/766 |
| 4,609,317 | A * | 9/1986 | Dixon | B65D 19/38 29/523 |
| 5,073,070 | A * | 12/1991 | Chang | F16B 5/0208 411/105 |
| 5,141,357 | A * | 8/1992 | Sherman | F16B 5/025 403/4 |
| 5,188,479 | A * | 2/1993 | Nehls | F16B 19/1081 403/306 |
| 5,548,939 | A * | 8/1996 | Carmical | E04B 1/4135 52/707 |
| 6,397,552 | B1 * | 6/2002 | Bourque | E04B 1/003 52/712 |
| 7,455,471 | B2 * | 11/2008 | Gawehn | F16B 5/025 411/398 |
| 8,209,917 | B1 * | 7/2012 | DeZaio | E04C 2/384 52/285.3 |
| 8,272,806 | B2 * | 9/2012 | Mogar | E04B 2/90 403/403 |
| 8,393,124 | B2 * | 3/2013 | Zimmer | F16B 13/063 52/351 |
| 9,068,347 | B2 * | 6/2015 | Moeller | E04B 2/90 |
| 9,359,756 | B2 * | 6/2016 | Hardy | E04B 1/2403 |
| 10,017,934 | B2 * | 7/2018 | Getz | E04B 1/40 |
| 10,125,800 | B1 | 11/2018 | Dominguez | |
| 10,450,740 | B2 * | 10/2019 | Magargee | E02D 27/42 |
| 10,465,726 | B2 * | 11/2019 | Bullard | F16B 19/02 |
| 10,697,173 | B2 * | 6/2020 | Drummond | E04B 1/4157 |
| 2015/0110577 | A1 | 4/2015 | Hahner | |
| 2017/0356479 | A1 * | 12/2017 | Dominguez | F16B 35/005 |

FOREIGN PATENT DOCUMENTS

| | | | | |
|---|---|---|---|---|
| EP | 2316724 | A2 * | 5/2011 | ............... B64C 1/06 |
| EP | 2855947 | A1 | 4/2015 | |
| FR | 2744501 | A1 * | 8/1997 | ............ F16B 5/0225 |
| FR | 2744501 | A1 | 8/1997 | |
| JP | 2005330788 | A | 12/2005 | |
| JP | 2012167523 | A | 9/2012 | |
| WO | WO-2011104390 | A1 * | 9/2011 | ............. B28B 23/00 |

* cited by examiner

DEVICE AND METHOD FOR ANCHORING AN EQUIPMENT TO A CIVIL ENGINEERING STRUCTURE

The invention relates in general to the anchoring of equipment on civil engineering structures, in particular in nuclear power plants.

BACKGROUND

In nuclear power plants, the pipes and other components of the hydraulic circuits can be supported by using anchoring plates attached in civil engineering structures by metal dowels. Metal beams, for example tubes or profiles, are welded on the plates to serve as support for the pipes.

Each nuclear power plant is equipped with kilometers of pipes, and thousands of supports, so as to keep these pipes in place. These supports are designed to withstand all sorts of stresses, in particular thermal expansions of the pipes and earthquakes.

To that end, it is necessary to attach anchoring plates in reinforced concrete foundations, using the metal dowels.

Before the placement of these dowels, the exact position of irons making up the metal framework of the concrete must be identified. Indeed, it is necessary to avoid inadvertently cutting the irons during drilling of the concrete, since cutting an iron would compromise the civil engineering structure.

The position of the dowels relative to the plate can next be adapted as a function of the position of the irons. The final positions of the dowels on the plate are therefore not known before the on-site intervention.

The plate can be drilled on the site, once the final positions are known. This drilling can be done with great precision, since the diameter of the drilling holes in the plate is barely two millimeters larger than the diameter of the rods of the dowels. In case of drilling error of the plate, it is necessary to repeat the operation on a new plate.

Such an approach leads to a relatively long on-site intervention time, which is particularly problematic given that the intervention is on the critical path of the unit outages and requires mobilizing very costly teams and physical resources.

Furthermore, all of the mechanical strength studies of the plate and anchors are done upstream from the on-site intervention, based on nominal positions of the dowels relative to the plate, and not final positions.

SUMMARY

In this context, an aim of the present disclosure is to provide a device for anchoring an equipment item to a civil engineering structure that does not have the above drawbacks.

An anchoring device is provided comprising:
  a support plate for the equipment, the plate comprising at least two orifices;
  for each orifice, a longitudinal dowel intended to be rigidly fastened in the civil engineering structure;
  for each orifice, a fastening member mounted around the dowel;
  for each orifice, a connection of the fastening member to the plate, allowing the fastening member to be placed at any given position in a defined region of the orifice in a plane parallel to the plate;
  for each orifice, a reversible lock for blocking the fastening member with respect to the plate in the given position and for blocking the fastening member in position along the dowel.

Thus, it is possible, during the installation of the anchoring device, to fasten the dowel in the civil engineering structure over an entire range of positions, corresponding to the surface of the determined zone of the corresponding orifice. The actual position of the dowel can therefore be chosen by taking account of the position of the irons potentially reinforcing the civil engineering structure. The connection of the dowel to the plate makes it possible to receive the dowel inside the orifice, irrespective of the position of this dowel in the determined zone of the orifice. The reversible locking next makes it possible to block the dowel in this given position relative to the plate, by means of the fastening member.

Typically, said determined zone corresponds to the entire orifice, in particular when the orifice is circular.

Beforehand, that is to say, before the on-site intervention, it will have been verified through calculations that the device for anchoring the equipment to the civil engineering structure meets all of the mechanical strength requirements, irrespective of the considered load scenario.

It is thus possible to use plates with predrilled orifices, these plates therefore no longer needing to be drilled on site.

There is no longer a risk of drilling error on the plate, that is to say, a risk of the drillings done on the plate not corresponding to the actual positions of the dowels fastened in the civil engineering structure.

Furthermore, the anchoring device makes it possible to position the plate in the location provided by the design teams relative to the civil engineering structure. This is possible due to the connection of each dowel to the plate, making it possible to place the dowel in any given position in the corresponding orifice.

The anchoring device may also have one or more of the features below, considered individually or according to any technical possible combination(s):
  the dowel comprises a rod, a segment of which is engaged in said determined zone of the orifice, the segment having a rod section in a plane perpendicular to the longitudinal direction, the determined zone of the orifice having a zone section in said plane perpendicular to the longitudinal direction greater than four times the rod section;
  the orifice has a circular section;
  the connection of the fastening member to the plate comprises a ring with a shape conjugated to that of the orifice, having a central axis and a radially outer edge, the ring having a slit extending from the central axis to the radially outer edge in which the fastening member is engaged;
  the ring has a cylindrical or frustoconical shape;
  the slit is delimited by two edges that are inclined relative to one another, the section of the slit decreasing longitudinally from a large front face of the ring to a large rear face of the ring;
  before locking, the ring has an outer diameter, the orifice having an inner diameter from 0.01 to 1 mm greater than said outer diameter;
  the fastening member has a converging shape, with a rear longitudinal end facing toward the large rear face and a front longitudinal end with a relatively larger section than the rear longitudinal end;

the lock comprises a nut screwed on a threaded end of the dowel, stressing the fastening member toward the large rear face of the ring;

the fastening member is a split ring.

A method is also provided for anchoring an equipment item to a civil engineering structure, the method comprising the following steps:

obtaining a support plate for the equipment, comprising at least two orifices;

for each orifice, fastening a longitudinal dowel in the civil engineering structure;

placing the plate against the civil engineering structure, each dowel being located in a given position in a determined zone of the corresponding orifice in a plane parallel to the plate;

mounting a fastening member around each dowel;

blocking each fastening member with respect to the plate in the given position and blocking the fastening member in position along the dowel;

the dowel comprising a rod, a segment of which is engaged in said determined zone of the orifice, the segment having a rod section in a plane perpendicular to the longitudinal direction, said determined zone of the orifice having a zone section in said plane perpendicular to the longitudinal direction greater than four times the rod section.

The anchoring method may also have one or more of the features below, considered individually or according to any technically possible combinations:

placing, in each orifice, a ring with a shape conjugated to that of the orifice, having a central axis and a radially outer edge, the ring having a slit extending from the central axis to the radially outer edge, the slit being oriented so that the segment of the fastening member is received in the slit;

the ring has a cylindrical or frustoconical shape.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
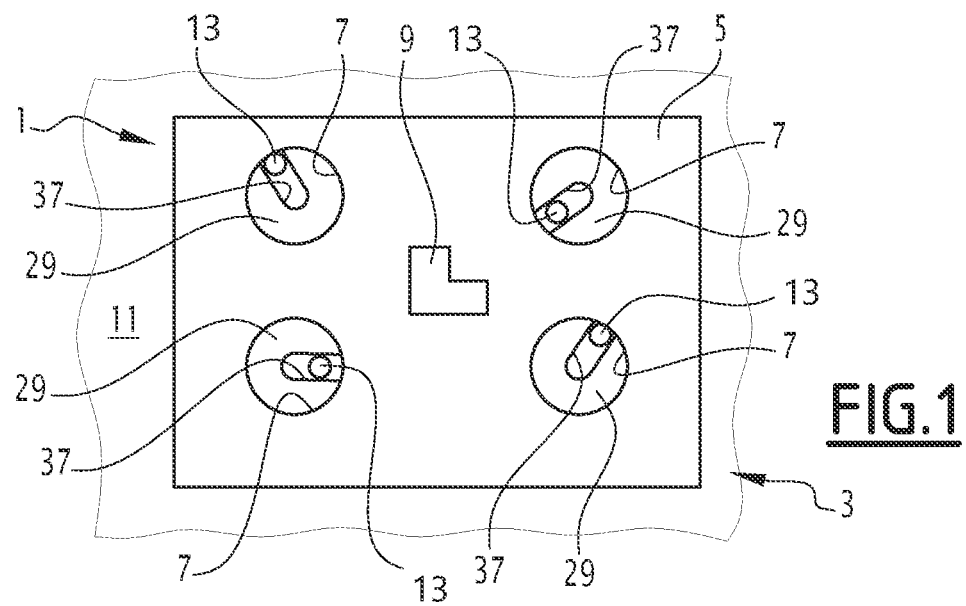
FIG. 1 is a schematic illustration of the anchoring device mounted on the civil engineering structure, in front view.
Figure 2:
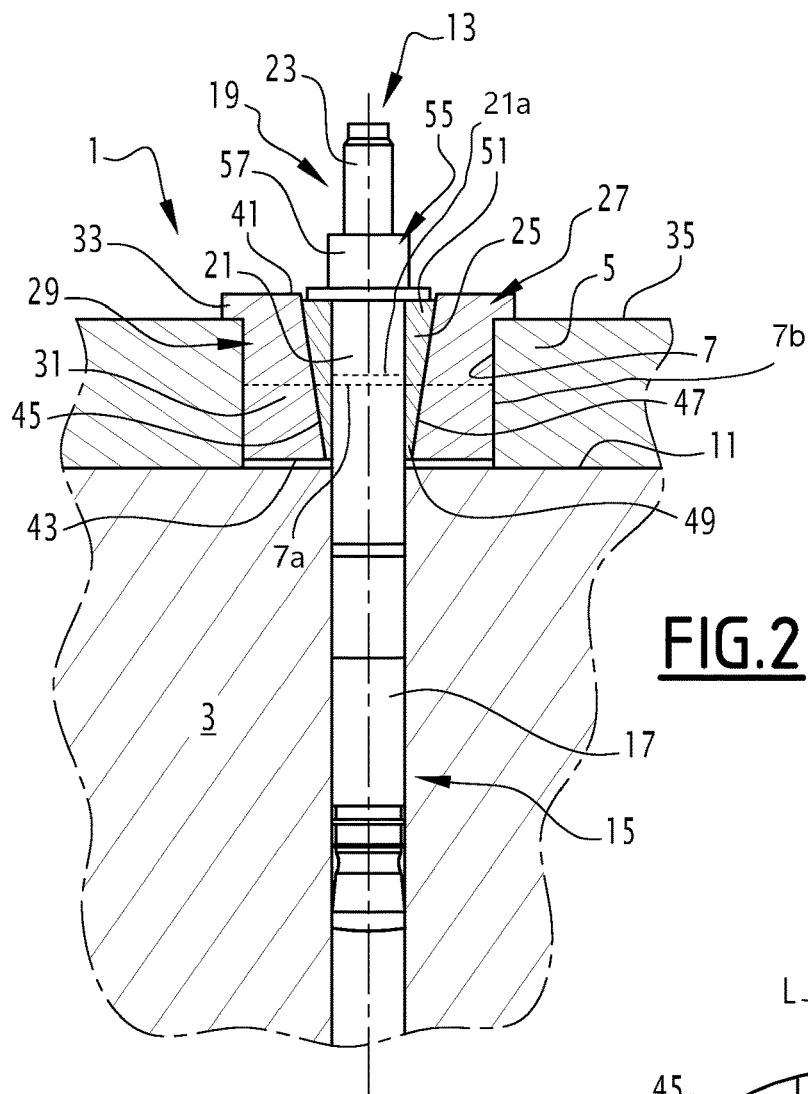
FIG. 2 is a longitudinal sectional view of the device of FIG. 1, for a generally cylindrical ring.

The anchoring device 1 shown in FIGS. 1 and 2 is intended for the fastening of an equipment item to a civil engineering structure 3. The civil engineering structure is part of a nuclear power plant. In a variant, it is part of an industrial facility of another type, or is part of a nonindustrial building.

The civil engineering structure is typically made from reinforced concrete, that is to say, concrete reinforced by metal rods embedded in said concrete. In a variant, the civil engineering structure is made from non-reinforced concrete.

The civil engineering structure is a wall, a concrete foundation, a floor, a ceiling, or any other suitable structure.

The equipment item fastened by the anchoring device to the civil engineering structure 3 is for example a pipe, or a vessel, or a ventilation duct, or a cable raceway, or any other type of equipment item.

The anchoring device is designed to fasten the equipment item to the civil engineering structure while respecting multiple constraints, in particular earthquake resistance, in accordance with the international and national standards defining the acceptable criteria, for example the ETA (European Technical Approval).

Figure 3:
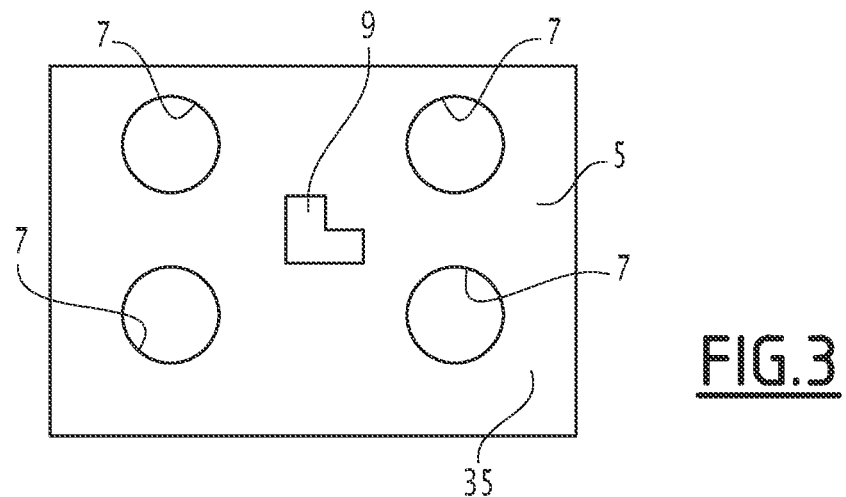
FIG. 3 is a front view of the plate of the device of FIGS. 1 and 2.
Figure 6:
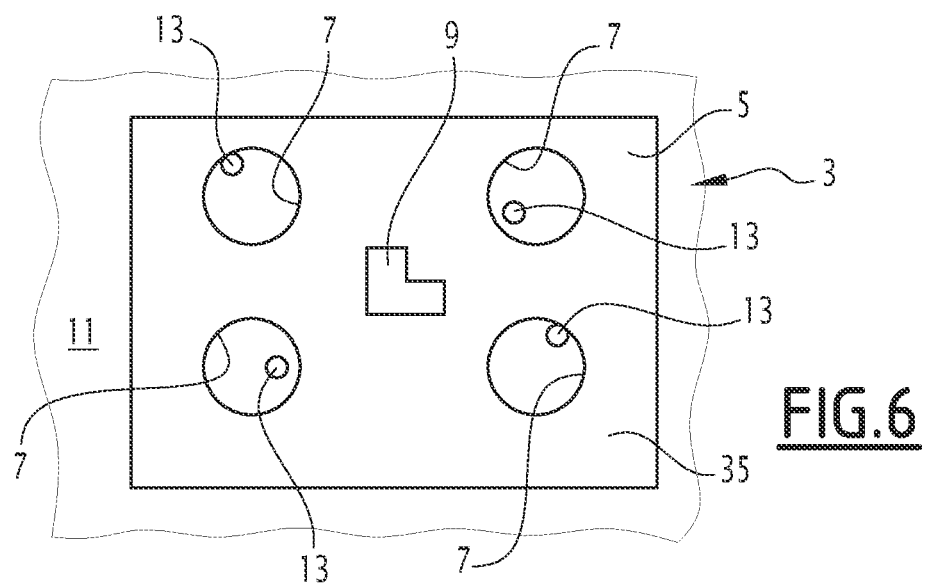
FIG. 6 is a view illustrating the position of the dowels after fastening in the civil engineering relative to the orifices of the plate.

The anchoring device 1 comprises a support plate 5 for the equipment, the plate 5 in turn comprising at least two orifices 7 (FIG. 3).

The plate 5 is a metal plate, typically made from steel. It has a thickness of several millimeters. It is for example rectangular, but could have any other suitable shape.

The plate 5 bears a support member 9 for the equipment. This member 9 is for example a metal beam, or metal bracket, or any other suitable member.

The support member 9 is generally welded on the plate 5.

The support member 9 is fastened to the center of the plate 5. In the case of a rectangular plate, the center corresponds to the intersection of the two diagonals. In a variant, the support member 9 can be fastened anywhere on the plate, at one or several points.

The plate 5 includes four orifices 7 in the illustrated example. In a variant, it includes three orifices 7, or more than four orifices 7 or only two orifices 7.

The orifices 7 are advantageously evenly distributed around the member 9. In a variant, the orifices 7 are distributed anywhere on the plate as a function of the position of the support member 9 on said plate, taking account of the mechanical strength requirements according to the desired load.

The plate 5 is provided to be placed against the free surface 11 of the civil engineering structure, typically pressed directly against this surface 11. In a variant, a space exists between the plate 5 and the surface 11, the plate 5 being pressed against the free surface 11 using any suitable mechanical component, such as feet.

The anchoring device 1 includes, for each orifice 7, a longitudinal dowel 13, intended to be rigidly fastened in the civil engineering structure 3.

The longitudinal direction is substantially perpendicular to the plane in which the plate 5 extends, that is to say, the plane of the free surface 11.

To that end, the civil engineering structure 3 comprises holes 15, each provided to receive one of the dowels 13. The holes 15 emerge at the surface 11.

The dowel 13 includes, at a rear longitudinal end, a head 17, provided to be engaged inside the hole 15, and rigidly fastened to the civil engineering structure 3 by cooperation with the wall of the hole 15.

The head 17 is for example blocked inside the hole 15 by radial expansion of a segment of the head 17, said segment being locked in position inside the hole 15 by pressure against the wall of said hole. Such an operation is known, and the head 17 of the dowel will not be described in more detail here.

The dowel 13 further includes a rod 19, a segment 21 of which is engaged in the corresponding orifice 7. The rod 19 is longitudinally elongated, and is secured to the head 17.

The dowel 13 further has a threaded front end 23.

The threaded end 23 is defined by the rod 19. The segment 21 extends longitudinally between the threaded end 23 and the head 17.

The anchoring device 1 further includes, for each orifice 7, a fastener in the form of a fastening member 25 mounted around the corresponding dowel 13.

The fastening member 25 typically assumes the form of a ring.

The fastening member 25 is slipped around the segment 21.

As visible in the figures, the segment 21 has, in a transverse plane perpendicular to the longitudinal direction, a determined rod cross section 21a.

The orifice 7 in turn has an orifice section in said transverse plane, greater than four times the rod cross section 21a. The orifice section is preferably greater than six times the rod cross section 21a and further preferably greater than ten times the rod cross section 21a.

The anchoring device further includes, for each orifice 7, a connection 27 of the fastening member 25 to the plate 5, allowing the fastening member 25 to be placed at any given position in a defined region of the orifice 7, in a plane parallel to the plate.

Said determined zone of the orifice 7 has a zone cross section 7a in said transverse plane, greater than four times the rod cross section 21a. The zone cross section 7a is preferably greater than six times the rod cross section 21a and further preferably greater than ten times the rod cross section 21a.

Typically, said determined zone corresponds to the entire orifice 7, in particular when the orifice 7 is circular. In a variant, said determined zone covers only part of the orifice, in particular when the orifice has an irregular shape.

Figure 4:
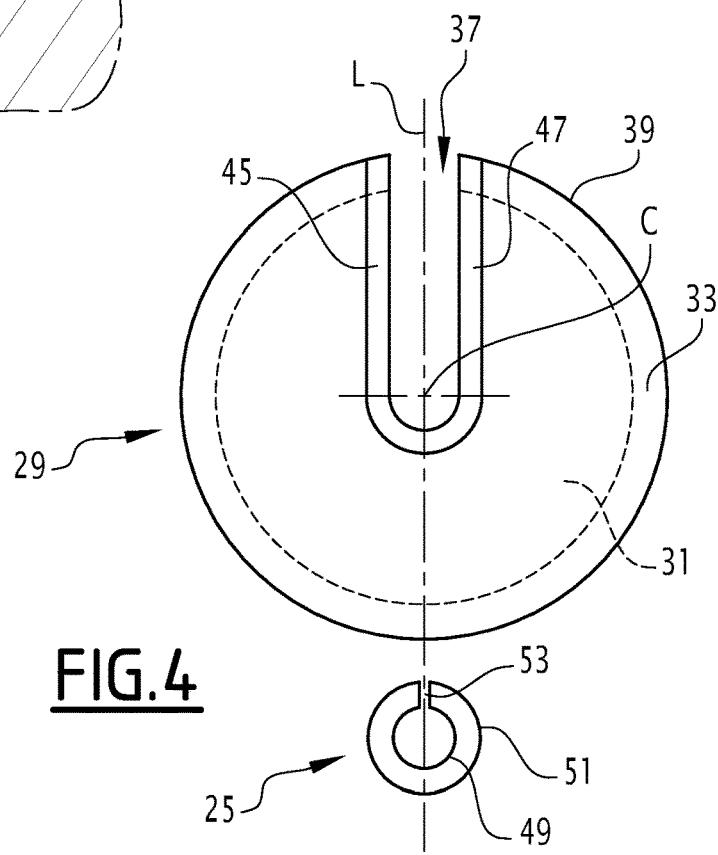
FIG. 4 is a front view of the ring and the fastening member of the device of FIGS. 1 and 2.

For each orifice 7, the connection 27 advantageously comprises a ring 29, illustrated in FIG. 4, with a shape conjugated to that of the orifice 7.

In transverse planes, the ring 29 has circular sections.

As illustrated in FIGS. 2 and 4, the ring 29 is typically cylindrical.

It comprises a cylindrical part 31, with longitudinal central axis C. The cylindrical part 31 is engaged in the orifice 7.

Advantageously, at its front longitudinal end, provided to be arranged opposite the free surface 11, the cylindrical part 31 bears a protruding flange 33. The flange 33 is located outside the orifice 7. It bears against the front surface 35 of the plate 5, over the entire periphery of the orifice 7.

In this case, each orifice 7 also has a circular cross-section, as illustrated in FIG. 3. The cross-section is constant over the entire longitudinal height of the orifice 7.

Figure 5:
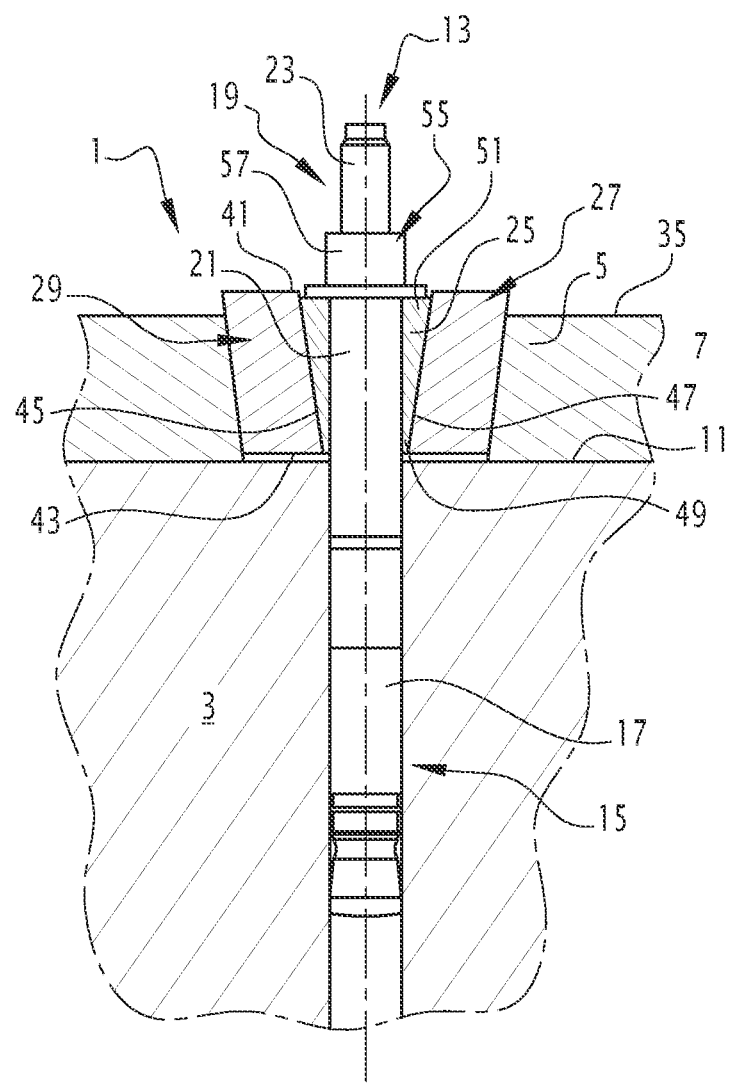
FIG. 5 is a view similar to that of FIG. 2, for a frustoconical ring.

In a variant, the ring 29 is frustoconical, as illustrated in FIG. 5. It has a longitudinal central axis. It does not include a protruding flange at its front longitudinal end. The cross-section of the ring 29 decreases longitudinally, from front to back.

In this case, each orifice 7 also has a frustoconical section.

Before locking of the fastening member 25 relative to the plate 5, the ring 29 has one/several outer diameter(s) slightly smaller than the inner diameter(s) of the orifice 7.

This means that the part of the ring 29 engaged in the orifice 7 has one/several outer diameter(s) slightly smaller than that/those of the orifice 7. The difference in diameter between the ring and the orifice is between $1/100$ mm and 1 mm, preferably between $1/100$ mm and $5/10$ mm.

Such a difference in diameter makes it possible to rotate the ring 29 easily inside the corresponding orifice 7, in order to adapt to the actual position of the dowel.

As clearly shown in FIG. 4, the ring 29 includes a slit 37, extending slightly from a radially central zone of the ring to a radially outer edge 39 of said ring. The fastening member 25 is engaged in the slit 37.

The slit 37 extends over the entire longitudinal height of the ring 29, and emerges both on the large front face 41 and on the large rear face 43 of the ring 29. The large front and rear faces 41 and 43 respectively face away from the surface 11 and toward the surface 11. The slit 37 also emerges at the radially outer edge 39.

Typically, the slit 37, considered in a transverse plane, is rectilinear and extends along a radius of the ring 29.

In a variant, it is not rectilinear, but bowed.

The slit 37 is delimited by two edges 45, 47 that are inclined relative to one another. The edges 45 and 47 are across from one another. They converge toward one another when they are followed longitudinally from the large front face 41 to the large rear face 43 of the ring (see FIG. 2).

In other words, the section of the slit 37, considered in a transverse plane, decreases longitudinally from the large front face 41 to the large rear face 43.

As shown in FIGS. 2 and 4, the fastening member 25 has a convergent shape. It has a rear longitudinal end 49, facing toward the large rear face 43 with relatively smaller cross-section, and a front longitudinal end 51 with a relatively larger cross-section. Advantageously, it has a frustoconical shape, with central longitudinal axis.

Considered in a plane perpendicular to the central axis C of the cylindrical ring, the slit 37 has a central line L, visible in FIG. 4. The edges 45 and 47 of the slit, considered in section in a plane perpendicular to the line L and parallel to the central axis C, form an angle between them substantially equal to the opening angle of the cone section defined by the fastening member 25.

Thus, as illustrated in FIG. 2, when the fastening member 25 is engaged in the slit 37, its outer surface is in contact with both edges 45 and 47 at once.

It is therefore understood that the fastening member 25 may be placed in any given position in the orifice, by rotation of the ring about the central axis C, and movement of the fastening member 25 along the slit 37.

Furthermore, the fastening member 25 is split. It has a circumferential interruption 53, shown in FIG. 4. This interruption 53 extends longitudinally over the entire length of the fastening member, and radially over the entire thickness of the fastening member.

The anchoring device 1 further includes, for each orifice 7, a reversible lock 55.

The reversible lock 55 blocks the fastening member 25 with respect to the plate 5 in the given position, and blocks the fastening member 25 in position along the dowel 13.

Advantageously, the lock 55 comprises a nut 57 screwed on a threaded end 23 of the dowel, and stressing the fastening member 25 toward the large rear face 43 of the ring 29. The nut 57 comes into contact with the front longitudinal end 51 of the fastening member 25.

The nut 57 stresses the fastening member 25 toward the inside of the slit 37, and tends to push the fastening member 25 into this slit 37.

Due to the converging shape of the fastening member 25 and because the section of the slit 37 tends to decrease from front to back, the fastening member 25 is blocked longitudinally, its outer surface bearing against the inclined edges 45 and 47 of the slit 37.

The tightening of the screw causes the closing of the interruption 53, the fastening member 25 thus being gripped against the rod of the dowel.

Furthermore, the longitudinal force applied by the nut 57 on the fastening member 25 is converted into a force in a plane perpendicular to the longitudinal direction, tending to separate the inclined edges 45, 47 from one another.

As a result, once the nut 57 is screwed in enough, the outer edge 39 of the ring 29 bears against the peripheral edge of the orifice 7, by deformation of the ring 29 under the effect of the pushing in of the fastening member 25. The ring 29 thus bears against the peripheral edge of the orifice 7, blocking the ring 29 in position relative to the plate 5.

This double movement of pushing the fastening member 25 into the slit 37 and deformation of the ring 29, leads to the blocking of the fastening number 25 in position relative to the plate 5 in the given position.

A method for anchoring an equipment item to a civil engineering structure is also provided.

The anchoring method is provided to be implemented using an anchoring device 1 of the type described above. Conversely, the anchoring device is particularly suitable for carrying out the anchoring method that will be described below.

The anchoring method comprises the following steps:
- obtaining a support plate 5 for the equipment, the plate 5 comprising at least two orifices 7;
- for each orifice 7, fastening a longitudinal dowel 13 in the civil engineering structure 3;
- placing the plate 5 against the civil engineering structure 3, each dowel 13 being located in a given position in a determined zone of the corresponding orifice 7 in a plane parallel to the plate 5;
- mounting a fastening member 25 around each dowel 13;
- blocking each fastening member 25 with respect to the plate 5 in the given position and locking the fastening member 25 in position along the dowel 13.

The plate 5 is of the type described above. The orifices 7 are created in the plate 5 before the step for fastening the dowel 13 in the civil engineering structure 3.

As described above, each dowel 13 comprises a rod 19 whereof a segment 21 is engaged in said determined zone of the corresponding orifice 7. Said determined zone of the orifice 7 has a zone cross section 7a in the upper transverse plane greater than four times the section of the segment 21 of the rod 19, preferably greater than six times the section of the segment 21 of the rod 19, and also preferably greater than ten times said section of the segment 21 of the rod 19.

The orifice 7 in turn has an orifice section in said transverse plane, greater than four times the rod cross section 21a. The orifice section is preferably greater than six times the rod cross section 21a and further preferably greater than ten times the rod cross section 21a.

Typically, said determined zone corresponds to the entire orifice 7, in particular when the orifice 7 is circular. In a variant, said determined zone covers only part of the orifice, in particular when the orifice has an irregular shape.

The method preferably comprises a step for prior verification of the satisfactory mechanical strength of the anchoring of the equipment item of the civil engineering structure, in light of the mechanical loads to be considered. This strength is verified by calculation, taking account of the theoretical positions of the dowels 13 relative to the civil engineering structure 3, and a theoretical position of the support plate 5 relative to the civil engineering structure 3.

Before fastening of the dowels 13 in the civil engineering structure 3, the method advantageously comprises a step for identifying the exact position of the metal framework rods of the civil engineering structure.

The dowels 13 are fastened in the civil engineering structure 3 in positions chosen so as not to damage these metal rods. These positions, in some cases, differ from the theoretical positions considered for the aforementioned calculations.

The situation, once the plate 5 is placed against the civil engineering structure 3, is illustrated in FIG. 5.

When the plate 5 is in its theoretical position relative to the civil engineering structure 3 and when the dowels 13 are also in their theoretical positions, these dowels 13 are typically in the center of the orifices 7. FIG. 5 shows that, because the dowels are not necessarily placed in their theoretical positions relative to the civil engineering structure 3, the dowels 13 are located in given positions in the corresponding orifices 7, which do not correspond to the center of the orifices 7. The given positions are, however, inside the orifices 7.

In order to block each fastening member 25 with respect to the plate 5 in the given position, and to block the fastening member 25 in position along the dowel 13, the rings 29 are first placed in the orifices 7.

The slits 37 are oriented such that the segments 21 of the rods are received in the slit 37.

Then, a fastening member 25 is slipped around each dowel 13. The fastening member 25, once slipped around the corresponding dowel 13, is positioned along the segment 21 of the rod. A nut 57 is next screwed on the threaded end 23 of each dowel 13. The nut 57 urges the fastening member 25 toward the large rear face 43 of the ring 29, that is to say, toward the bottom of the slit 37. The latter bears on the inclined edges 45, 47, which causes a deformation of the ring 29, which in turn bears against the radially inner edge of the orifice 7. When the nut 57 is screwed enough, the ring 29 is blocked in position relative to the plate 5, and the fastening member 25 is blocked in position relative to the ring 29, both longitudinally along the dowel 13 and also along the slit 37.

The anchoring device and method described above have multiple advantages.

As described above, due to the existence of a connection of the fastening member to the plate, for each orifice, making it possible to place the fastening member in any given position in said determined zone of the orifice in a plane parallel to the plate, and due to the existence for each orifice of reversible locking making it possible to block the fastening member relative to the plate in the given position and to block the fastening member in position along the dowel, it is possible to considerably reduce the on-site operating times and to eliminate the risk of drilling errors on the plate.

Indeed, the plates can be predrilled, that is to say, drilled in the workshop before the fastening of the dowels to the civil engineering structure.

The plate can be fastened to the dowels, irrespective of their positions, even if these positions are different from the theoretical positions, considered for the load strength calculations of the anchoring device. The connection of the dowel to the plate indeed makes it possible to perform the fastening irrespective of the position of the dowel in the surface covered by said determined zone, which typically corresponds to any surface of the orifice.

This makes it possible to position the plate exactly in the location provided in the load strength calculations.

After locking of the fastening member relative to the plate in the given position, no gap remains between the ring and the edge of the orifice. This gap is typically filled in over the entire perimeter of the ring.

This is especially important due to the fact that standard EN1992-4 (Eurocode 2), for seismic stresses, requires an allowance of half of the shear strength of mechanical anchors if significant play exists between the body of the dowel and the anchoring plate.

In the device and method of the present disclosure, there is no longer any significant play between the body of the dowel and the anchoring plate, this play being entirely filled in by the fastening member and the ring.

The fact that the orifice has a section greater than four times the section of the segment of the rod makes it possible to vary the position of the dowel in the civil engineering structure over a wide range of positions, in particular to account for the position of the metal rods reinforcing the concrete.

Using a ring engaged in a circular orifice with a slit for receiving the fastening member allows very convenient sweeping of all possible positions of the dowels inside the orifices.

Using two edges that are inclined relative to one another for the slit makes it possible to block the fastening member relative to the plate very conveniently, and also makes it possible to fill in the play between the ring and the edge of the orifice at the time of tightening very conveniently.

The fact that the ring has an outer diameter from 0.01 to 1 mm smaller than the inner diameter of the orifice makes it possible to obtain both an easy orientation of the ring in the orifice and convenient filling of the play at the time of tightening.

When the fastening member has a convergent shape, the reversible locking is done particularly easily.

The use of a nut for the reversible locking is particularly practical, since simple screwing of the nut makes it possible to stress the fastening member toward the inside of the slit.

The fact that the fastening member is split allows easy placement of the fastening member along the rod of the dowel, then, at the time of locking, makes it possible to tighten and block the position of the fastening member along the rod.

The anchoring device and the anchoring method may assume multiple variants.

The longitudinal dowel may be of any suitable type.

The fastening member is not necessarily convergent, although the convergent form is preferred.

The fastening member may not be split, and may be blocked along the rod of the dowel by deformation under the effect of the locking.

The connection of the fastening member to the plate, allowing the fastening member to be placed at any given position in a defined region of the orifice, may be of any suitable type. This connection for example combines a rotational movement and a radial translational movement, like in the example described above. In a variant, this connection combines two degrees of rotational freedom, or two degrees of translational freedom.

The reversible locking can also be done by all appropriate means. The ring can be blocked by direct tightening of the flange against the plate. The fastening member is gripped against the ring independently of the blocking of the ring relative to the plate.

As indicated above, the determined zone preferably corresponds to the entire orifice. In a variant, the determined zone only covers part of the orifice, this part nevertheless remaining large enough to allow a wide variation range for the positioning of the fastening member. This is for example the case when the orifice has an irregular shape, with zones that are inaccessible for the connection of the fastening member to the plate (indentations on the edge of the orifice, slightly oval orifice receiving a circular ring, etc.). This is also the case when the slit of the ring has a shape that does not make it possible to position the fastening member anywhere, for example not in the center of the orifice.

What is claimed is:

1. A device for anchoring an equipment item to a civil engineering structure, the device comprising:
    a support plate for the equipment, the support plate comprising at least two orifices;
    for each orifice, a longitudinal dowel configured to be rigidly fastened in the civil engineering structure;
    for each orifice, a fastener mounted around the dowel;
    for each orifice, a connection of the fastener to the plate; and
    for each orifice, a reversible lock having an unlocking position and a locking position,
    in the unlocking position of the reversible lock, the connection allows the fastener to be placed at any given position in a defined region of the orifice in a plane parallel to the plate,
    in the locking position of the reversible lock, the fastener is blocked with respect to the plate in said given position and the fastener is blocked in position along the dowel,
    wherein the dowel comprises a rod, a segment of which is engaged in said defined region of the orifice, the segment having a rod cross section in a plane perpendicular to a longitudinal direction, the defined region of the orifice having a zone cross section in a plane perpendicular to the longitudinal direction greater than four times the rod section,
    the connection and the reversible lock thus allowing the fastener to be placed at any given position in said defined region of the orifice and to be locked at said given position of the orifice with respect to the plate.

2. The device according to claim 1, wherein the orifice has a circular section.

3. The device according to claim 2, wherein the connection of the fastener to the plate comprises a ring with a shape conjugated to that of the orifice, having a central axis and a radially outer edge, the ring having a slit extending from the central axis to the radially outer edge in which the fastener is engaged.

4. The device according to claim 3, wherein the ring has a cylindrical or frustoconical shape.

5. The device according to claim 4 wherein the slit is delimited by two edges that are inclined relative to one another, a cross section of the slit decreasing longitudinally from a large front face of the ring to a large rear face of the ring.

6. The device according to claim 3, wherein, before locking, the ring has an outer diameter, the orifice having an inner diameter from 0.01 to 1 mm greater than the outer diameter.

7. The device according to claim 3, wherein the fastener has a converging shape, with a rear longitudinal end facing toward a large rear face of the ring and a front longitudinal end with a relatively larger section than the rear longitudinal end.

8. The device according to claim 7, wherein the reversible lock comprises a nut screwed on a threaded end of the dowel, stressing the fastener toward the large rear face of the ring.

9. The device according to claim 7, wherein the wherein the fastener is a split ring.

10. The device according to claim 3, wherein the ring has a slit extending from the central axis to the radially outer edge, the connection and the reversible lock allowing the fastener to be placed in the locking position at any given position in the slit between the central axis and the radially outer edge.

11. The device according to claim 1, wherein the fastener is a split ring.

12. A method for anchoring an equipment item to a civil engineering structure using the device according to claim 1, the method comprising:
  obtaining the support plate for the equipment;
  for each orifice, fastening the longitudinal dowel in the civil engineering structure;
  placing the plate against the civil engineering structure, each dowel being located in a given position in a determined zone of the corresponding orifice in a plane parallel to the plate;
  mounting the fastener around each dowel; and
  blocking each fastener with respect to the plate in the given position and blocking the fastener in position along the dowel;
  the dowel comprising a rod, a segment of which is engaged in the determined zone of the orifice, the segment having a rod cross section in a plane perpendicular to the longitudinal direction, the determined zone of the orifice having a zone cross section in the plane perpendicular to the longitudinal direction greater than four times the rod section.

13. The method according to claim 12, further comprising:
  placing, in each orifice, a ring with a shape conjugated to that of the orifice, having a central axis and a radially outer edge, the ring having a slit extending from the central axis to the radially outer edge, the slit being oriented so that the segment of the fastener is received in the slit.

14. The method according to claim 13, wherein the ring has a cylindrical or frustoconical shape.

15. The device according to claim 1, wherein the connection of the fastener to the plate comprises a ring arranged in the orifice and having a shape conjugated to that of the orifice, the ring having a longitudinal central axis extending perpendicular to the plate and a radially outer edge, the fastener being mounted on the ring in said given position, the reversible lock blocking the fastener with respect to the ring in said given position and acting on the ring such that the radially outer edge of the ring is expanded in a plane perpendicular to the central axis and cooperates with a radially inner edge of the orifice for blocking the ring in position with respect to the support plate.

16. The device according to claim 15, wherein the ring has a slit extending from the central axis to the radially outer edge in which the fastener is engaged, the reversible lock acting on the ring such that the radially outer edge of the ring is expanded in a plane perpendicular to the central axis by inserting longitudinally the fastener into the slit, from a large front face of the ring to a large rear face of the ring.

17. The device according to claim 16, wherein the slit is delimited by two inclined edges that are inclined relative to one another, the cross section of the slit decreasing longitudinally from the large front face of the ring to the large rear face of the ring.

18. The device according to claim 17, wherein the fastener has a longitudinally converging shape, with a rear longitudinal end facing toward the large rear face and a front longitudinal end with a relatively larger cross section than the rear longitudinal end.

19. The device according to claim 17, wherein the reversible lock applies a longitudinal force on the fastener, the fastener cooperating with the inclined edges for converting the longitudinal force into a force in a plane perpendicular to the longitudinal direction, tending to separate the inclined edges from one another.

20. The device according to claim 1, wherein the connection of the fastener to the plate allows the fastener to be placed at any given position in a continuous defined region of the orifice in a plane parallel to the plate.

* * * * *